(12) United States Patent
Kim

(10) Patent No.: US 9,093,946 B2
(45) Date of Patent: Jul. 28, 2015

(54) METHODS AND APPARATUSES FOR CONTROLLING OUTPUT VOLTAGES OF INVERTERS DRIVING OF ELECTRIC MOTORS

(71) Applicant: Samsung Electronics Co., Ltd., Suwon-Si, Gyeonggi-Do (KR)

(72) Inventor: Hyun-bae Kim, Yongin-si (KR)

(73) Assignee: SAMSUNG ELECTRONICS CO., LTD. (KR)

(*) Notice: Subject to any disclaimer, the term of this patent is extended or adjusted under 35 U.S.C. 154(b) by 144 days.

(21) Appl. No.: 13/975,644

(22) Filed: Aug. 26, 2013

(65) Prior Publication Data
US 2014/0197765 A1    Jul. 17, 2014

(30) Foreign Application Priority Data
Jan. 14, 2013    (KR) .................. 10-2013-0004040

(51) Int. Cl.
*H03K 5/00*    (2006.01)
*H02P 27/08*    (2006.01)
*H02P 29/00*    (2006.01)

(52) U.S. Cl.
CPC ............ *H02P 27/08* (2013.01); *H02P 29/0038* (2013.01)

(58) Field of Classification Search
CPC ..... H02P 29/0038; H02P 27/08; H02P 27/06; H02P 21/0035; H02M 1/12
USPC ............ 318/400.2, 400.01, 400.02, 722, 599, 318/629, 632
See application file for complete search history.

(56) References Cited

U.S. PATENT DOCUMENTS

| | | | |
|---|---|---|---|
| 5,585,709 A * | 12/1996 | Jansen et al. | 318/807 |
| 6,023,417 A | 2/2000 | Hava et al. | |
| 6,137,258 A * | 10/2000 | Jansen | 318/802 |
| 6,788,024 B2 * | 9/2004 | Kaneko et al. | 318/807 |
| 7,176,652 B2 * | 2/2007 | Wakabayashi et al. | 318/400.02 |
| 7,449,859 B2 * | 11/2008 | Bae et al. | 318/807 |
| 7,642,737 B2 * | 1/2010 | Bae et al. | 318/400.02 |
| 2009/0108798 A1 | 4/2009 | Schulz et al. | |
| 2011/0068727 A1 | 3/2011 | Welchko et al. | |
| 2011/0231040 A1 | 9/2011 | Schulz et al. | |
| 2012/0112674 A1 | 5/2012 | Schulz et al. | |

\* cited by examiner

*Primary Examiner* — Bentsu Ro
*Assistant Examiner* — Thai Dinh
(74) *Attorney, Agent, or Firm* — Harness, Dickey & Pierce, PLC

(57) ABSTRACT

A method of controlling an output voltage of an inverter driving an electric motor may include removing harmonic components of an output current, which is output to the electric motor, by using a low pass filter and obtaining a fundamental component of the output current; calculating a current total harmonic distortion by using the fundamental component of the output current; comparing the current THD with a reference current THD; determining a pulse width modulation method to be changed from a first modulation method for reducing the harmonic components of the output current to a second modulation method for reducing a switching frequency of the inverter if the current THD is less than the reference current THD, the PWM method modulating a pulse width of a control pulse signal for controlling the output voltage of the inverter; and/or generating the control pulse signal based on the determined PWM method.

20 Claims, 6 Drawing Sheets

METHODS AND APPARATUSES FOR CONTROLLING OUTPUT VOLTAGES OF INVERTERS DRIVING OF ELECTRIC MOTORS

CROSS-REFERENCE TO RELATED APPLICATION(S)

This application claims priority to Korean Patent Application No. 10-2013-0004040, filed on Jan. 14, 2013, in the Korean Intellectual Property Office (KIPO), the entire contents of which are incorporated herein by reference.

BACKGROUND

1. Field

Some example embodiments may relate to methods and/or apparatuses for controlling output voltages of inverters driving electric motors.

2. Description of Related Art

Electrical motors that convert electrical energy into mechanical power are widely used in various applications such as electric cars, industrial equipment, and electrical appliances. In order to generate a stable torque with high efficiency by using an electric motor, it is important to effectively control an inverter driving the electric motor. Various pulse width modulation (PWM) techniques have been employed to control an output voltage of an inverter.

Since harmonic components in an output current or an output voltage output to an electric motor may cause unnecessary loss such as heat or noise, a method of controlling an output voltage of an inverter is required for reducing harmonics over the whole range of power of the electric motor and increasing the efficiency of the electric motor.

SUMMARY

Some example embodiments may provide methods and/or apparatuses for controlling output voltages of inverters driving of electric motors.

Some example embodiments may provide computer-recordable recording medium having stored thereon a program for executing the methods.

In some example embodiments, a method of controlling an output voltage of an inverter driving an electric motor may comprise removing harmonic components of an output current, which is output to the electric motor, by using a low pass filter (LPF) and obtaining a fundamental component of the output current; calculating a current total harmonic distortion (THD) by using the fundamental component of the output current; comparing the current THD with a reference current THD; determining a pulse width modulation (PWM) method to be changed from a first modulation method for reducing the harmonic components of the output current to a second modulation method for reducing a switching frequency of the inverter if the current THD is less than the reference current THD, the PWM method modulating a pulse width of a control pulse signal for controlling the output voltage of the inverter; and/or generating the control pulse signal based on the determined PWM method.

In some example embodiments, a method of controlling an output voltage of an inverter driving an electric motor may further comprise detecting a temperature of the inverter; and/or comparing the detected temperature of the inverter with a reference temperature of the inverter. The determining of the PWM method may comprise determining the PWM method to be changed from the first modulation method to the second modulation method if the current THD is less than the reference current THD and the detected temperature of the inverter is lower than the reference temperature of the inverter.

In some example embodiments, a method of controlling an output voltage of an inverter driving an electric motor may further comprise detecting a temperature of the electric motor; and/or comparing the detected temperature of the electric motor with a reference temperature of the electric motor. The determining of the PWM method may comprise determining the PWM method to be changed from the first modulation method to the second modulation method if the current THD is less than the reference current THD and the detected temperature of the electric motor is lower than the reference temperature of the electric motor.

In some example embodiments, a method of controlling an output voltage of an inverter driving an electric motor may further comprise detecting a temperature of the inverter; detecting a temperature of the electric motor; comparing the detected temperature of the inverter with a reference temperature of the inverter; and/or comparing the detected temperature of the electric motor with a reference temperature of the electric motor. The determining of the PWM method may comprise determining the PWM method to be changed from the first modulation method to the second modulation method if the current THD is less than the reference current THD, the detected temperature of the inverter is lower than the reference temperature of the inverter, and the detected temperature of the electric motor is lower than the reference temperature of the electric motor.

In some example embodiments, the determining of the PWM method may comprise determining the PWM method to be changed from the second modulation method to the first modulation method if the current THD is greater than the reference current THD.

In some example embodiments, the first modulation method may be a space vector pulse width modulation (SVPWM) technique, and/or the second modulation method may be a discontinuous pulse width modulation (DPWM) technique.

In some example embodiments, the generating of the control pulse signal may comprise generating the control pulse signal based on an offset signal corresponding to the determined PWM method.

In some example embodiments, the generating of the control pulse signal may comprise generating an offset signal corresponding to the determined PWM method; generating a second command signal by adding the offset signal to a first command signal input to control the driving of the electric motor; comparing a magnitude of the second command signal with a magnitude of a triangular carrier wave; and/or generating the control pulse signal based on a result of the comparison.

In some example embodiments, the determining of the PWM method may comprise adaptively determining the PWM method as the current THD changes according to the output voltage and a switching frequency of the inverter.

In some example embodiments, a computer-readable recording medium may have recorded thereon a program for executing the method of controlling an output voltage of an inverter driving an electric motor.

In some example embodiments, an apparatus for controlling an output voltage of an inverter driving an electric motor may comprise a low pass filter (LPF) configured to remove harmonic components of an output current, which is output to the electric motor, to obtain a fundamental component of the output current; a current total harmonic distortion (THD) calculation unit configured to calculate a current THD by using the fundamental component of the output current; a modulation method determination unit configured to compare the current THD with a reference current THD and configured to determine a pulse width modulation (PWM) method to be changed from a first modulation method for reducing the harmonic components of the output current to a second modulation method for reducing a switching frequency of the inverter if the current THD is less than the reference current THD, the PWM method modulating a pulse width of a control pulse signal for controlling the output voltage of the inverter; and/or a control pulse signal generation unit configured to generate the control pulse signal based on the determined PWM method.

In some example embodiments, the modulation method determination unit may be further configured to compare a temperature of the inverter with a reference temperature of the inverter and may be further configured to determine the PWM method to be changed from the first modulation method to the second modulation method when the current THD is less than the reference current THD and the temperature of the inverter is lower than the reference temperature of the inverter.

In some example embodiments, the modulation method determination unit may be further configured to compare a temperature of the electric motor with a reference temperature of the electric motor and/or may be further configured to determine the PWM method to be changed from the first modulation method to the second modulation method when the current THD is less than the reference current THD and the temperature of the electric motor is lower than the reference temperature of the electric motor.

In some example embodiments, the modulation method determination unit may be further configured to compare a temperature of the inverter and a temperature of the electric motor with a reference temperature of the inverter and a reference temperature of the electric motor, respectively, and/or may be further configured to determine the PWM method to be changed from the first modulation method to the second modulation method when the current THD is less than the reference current THD, the temperature of the inverter is lower than the reference temperature of the inverter, and the temperature of the electric motor is lower than the reference temperature of the electric motor.

In some example embodiments, the modulation method determination unit may be configured to determine the PWM method to be changed from the second modulation method to the first modulation method when the current THD is greater than the reference current THD.

In some example embodiments, the first modulation method may be a space vector pulse width modulation (SVPWM) technique, and/or the second modulation method may be a discontinuous pulse width modulation (DPWM) technique.

In some example embodiments, the modulation method determination unit may be further configured to adaptively determine the PWM method as the current THD changes according to the output voltage and a switching frequency of the inverter.

In some example embodiments, a system for driving an electric motor may comprise a current detector configured to detect an output current which is output to the electric motor; a control apparatus configured to determine a pulse width modulation (PWM) method for modulating a pulse width of a control pulse signal based on a current total harmonic distortion (THD) of the output current and configured to generate the control pulse signal based on the determined PWM method; and/or an inverter configured to convert an input power supply into an output voltage based on the control pulse signal and configured to supply the output voltage to the electric motor. The control apparatus may comprises a low pass filter (LPF) configured to remove harmonic components of the output current to obtain a fundamental component of the output current; a current THD calculation unit configured to calculate the current THD by using the fundamental component of the output current; a modulation method determination unit configured to compare the current THD with a reference current THD and determines the PWM method to be changed from a space vector pulse width modulation (SVPWM) technique to a discontinuous pulse width modulation (DPWM) technique; and/or a control pulse signal generation unit configured to generate the control pulse signal based on the determined PWM method.

In some example embodiments, a system for driving an electric motor may further comprise a first temperature sensor configured to detect a temperature of the inverter; and/or a second temperature sensor configured to detect a temperature of the electric motor. The modulation method determination unit may be further configured to compare the temperature of the inverter and the temperature of the electric motor with a reference temperature of the inverter and a reference temperature of the electric motor, respectively, and may be further configured to determine the PWM method to be changed from the SVPWM technique to the DPWM technique when the current THD is less than the reference current THD, the detected temperature of the inverter is lower than the reference temperature of the inverter, and the detected temperature of the electric motor is lower than the reference temperature of the electric motor.

In some example embodiments, the modulation method determination unit may be further configured to adaptively determine the PWM method as the current THD changes according to the output voltage and a switching frequency of the inverter.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
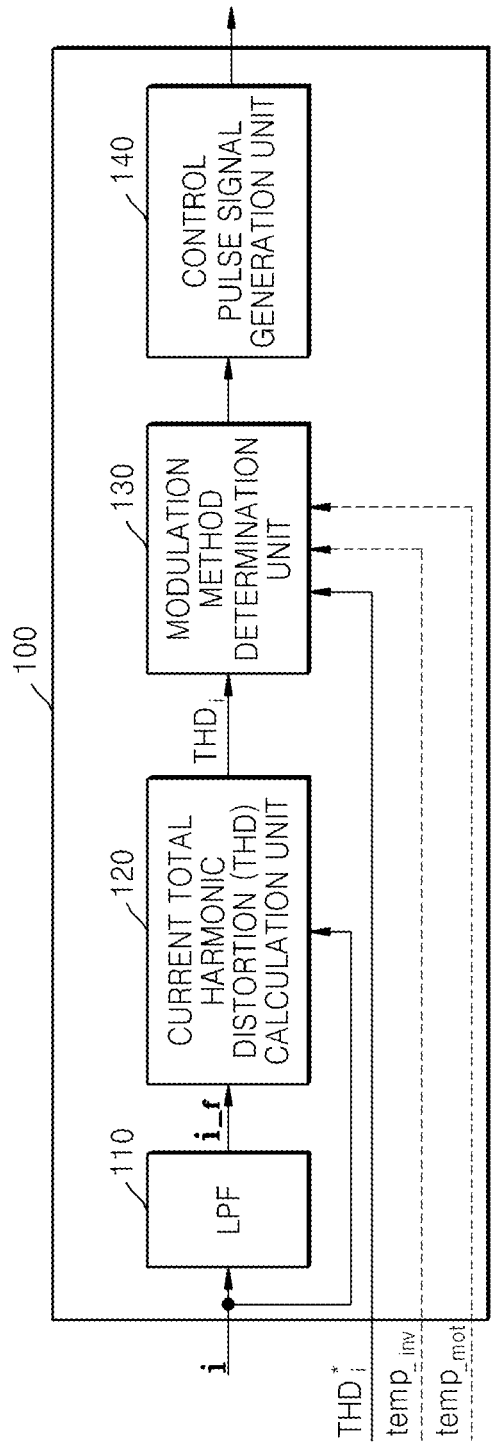
FIG. 1 is a block diagram of an apparatus for controlling an output voltage of an inverter, according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a block diagram of an apparatus 100 (hereinafter, referred to as a control apparatus) for controlling an output voltage of an inverter, according to some example embodiments. Referring to FIG. 1, the control apparatus 100 includes a low pass filter (LPF) 110, a current total harmonic distortion (THD) calculation unit 120, a modulation method determination unit 130, and a control pulse signal generation unit 140.

While FIG. 1 illustrates only components related to some example embodiments, it will be understood by one of ordinary skill in the art that the control apparatus 100 may further include other general-purpose components.

The control apparatus 100 may be or include at least one processor. The control apparatus 100 may be embedded in another hardware device such as a microprocessor or a general-purpose computer system.

Referring to FIG. 1, the control apparatus 100 controls an output voltage of an inverter (not shown) driving an electric motor (not shown). The control apparatus 100 is configured to generate a control pulse signal based on a current THD of an output current that is output to the electric motor, and the inverter generates an output voltage according to the control pulse signal. As a result, the output voltage of the inverter is controlled by the control apparatus 100.

The LPF 110 removes a high frequency component of an output current that is output to the electric motor. Thus, harmonic components of the output current are removed by the LPF 110, and a fundamental component of the output current may be obtained. The output current that is output to the electric motor may be detected by using a shunt resistor or an instrumental current transformer. The control apparatus 100 may calculate a current THD without performing an arithmetic operation such as a Fourier Transform by using the LPF 110. Thus, the control apparatus 100 may reduce the amount of calculations necessary for calculating the current THD.

The current THD calculation unit 120 calculates the current THD by using the fundamental component of the output current. The harmonic distortion is a distortion of a fundamental waveform, which is caused by harmonic components that are integer multiples of a fundamental frequency component. The harmonic components act as noise such as electromagnetic interference (EMI) during a drive of the electric motor, thereby causing a malfunction in the drive of the electric motor. Accordingly, the control apparatus 100 may control the harmonic components by calculating a current THD in real time and changing a modulation method according to the calculated current THD.

The current THD calculation unit 120 calculates the current THD to control the harmonic components of the electric motor. A THD may be calculated with respect to current and voltage, respectively. In some example embodiments, a modulation method is determined by using a current THD instead of a voltage THD. The current THD is a value that changes according to the output voltage and switching frequency of the inverter unlike the voltage THD, and it is possible to effectively drive the electric motor by adaptively determining a pulse width modulation (PWM) method according to the output voltage and switching frequency of the inverter.

The modulation method determination unit 130 compares a current THD THDi with a reference current THD THDi*, and determines a PWM method of a control pulse signal based on a comparison result. When the current THD is less than the reference current THD, the modulation method determination unit 130 determines the PWM method to be changed from a first modulation method for reducing harmonic components of the output current to a second modulation method for reducing a switching frequency of the inverter.

In this case, the PWM method refers to a technique for modulating the pulse width of a control pulse signal for controlling an output voltage of the inverter. The magnitude and frequency of an output voltage from the inverter is determined as switching devices of the inverter are switched on or off according to a control pulse signal. Thus, the number of harmonic components in the output voltage and output current, which are output to the electrical motor, and a switching loss of the switching devices of the inverter may vary according to a technique of modulating the pulse width of the control pulse signal.

The modulation method determination unit 130 determines any one of the first and second modulation methods as the PWM method according to the current THD. The modulation method determination unit 130 changes the PWM method to the first or second modulation method in order to minimize distortion due to harmonics over the whole range of the output voltage while increasing the switching efficiency of the inverter.

The reference current THD is used as a reference value to change the PWM method from the first modulation method to the second modulation method. The reference current THD may be set in advance through the control apparatus 100. The reference current THD may be experimentally or theoretically determined based on the switching efficiency of the inverter, the power efficiency of the electric motor, and/or a malfunction occurrence frequency of the electric motor due to harmonic components.

The control apparatus 100 may adaptively determine the PWM method according to changes in the output voltage and the switching frequency of the inverter by changing the PWM method according to an output current THD based on the reference current THD.

Thus, when the current THD is less than the reference current THD, the modulation method determination unit 130 determines the PWM method to be changed from the first modulation method to the second modulation method that reduces the switching frequency of the inverter, thereby reducing a switching loss of switching devices of the inverter. Thus, the efficiency of the output voltage is increased.

On the other hand, when the current THD is greater than the reference current THD, the modulation method determination unit 130 determines the PWM method to be changed from the second modulation method to the first modulation method so as to reduce the harmonic components of the output current, and thus, the control apparatus 100 reduces the harmonic components of the output current that is output to the electric motor.

In some example embodiments, the first modulation method may be a space vector pulse width modulation (SVPWM) technique, and the second modulation method may be a discontinuous pulse width modulation (DPWM) technique.

In the SVPWM technique, output voltages that may be generated by the inverter are represented by a space vector on a complex number space. The SVPWM technique modulates a pulse width of a control pulse signal according to the space vector. In this case, according to the SVPWM technique, all three-phase of switching devices are driven. Compared to other PWM techniques, the SVPWM technique may provide a maximum output voltage with respect to an input voltage that is provided to the inverter and less harmonic components in the output voltage or output current that is output to the electric motor.

The DPWM technique is used to modulate a pulse width of a control pulse signal so that only two phases from among three phases are switched within one period of switching of switching devices of an inverter (not shown) outputting output voltages in three phases. Thus, the DPWM technique may reduce the number of switchings of the inverter's switching devices and thus may minimize switching losses of the switching devices compared to other PWM methods.

Thus, when the current THD is greater than the reference current THD, the modulation method determination unit 130 uses an SVPWM technique to reduce the harmonic components of the electric motor. On the other hand, when the current THD is less than the reference current THD, the modulation method determination unit 130 uses a DPWM technique to minimize switching losses of the inverter.

Thus, the control apparatus 100 may increase the efficiency of power of the electric motor while minimizing distortion due to harmonic components of the electric motor.

According to some example embodiments, the modulation method determination unit 130 may further use, other than the current THD, the temperature of the inverter to determine the PWM method. In this case, the modulation method determination unit 130 compares the temperature of the inverter with a reference temperature of the inverter. The temperature of the inverter may be detected by a temperature sensor (not shown). The reference temperature of the inverter may be set in advance through the control apparatus 100. The reference temperature of the inverter may be experimentally or theoretically determined based on the switching efficiency of the inverter, the power efficiency of the electric motor, a malfunction occurrence frequency of the electric motor due to harmonic components, and/or a malfunction occurrence frequency due to heat generation of the inverter.

The modulation method determination unit 130 determines the PWM method based on the current THD and the comparison result of the temperature of the inverter. When the current THD is less than the reference current THD and the temperature of the inverter is less than the reference temperature of the inverter, the modulation method determination unit 130 determines the PWM method to be changed from the first modulation method to the second modulation method. When the temperature of the inverter is relatively high although the current THD of the output current is decreased, the modulation method determination unit 130 does not change the PWM method. Thus, the control apparatus 100 may efficiently drive the electric motor in consideration of the heat generation of the inverter as well as power and harmonic distortion of the electric motor.

According to some example embodiments, the modulation method determination unit 130 may further use, other than the current THD, the temperature of the electric motor to determine the PWM method. In this case, the modulation method determination unit 130 compares the temperature of the electric motor with a reference temperature of the electric motor. The temperature of the electric motor may be detected by a temperature sensor (not shown). The reference temperature of the electric motor may be set in advance through the control apparatus 100. The reference temperature of the electric motor may be experimentally or theoretically determined based on the switching efficiency of the inverter, the power efficiency of the electric motor, a malfunction occurrence frequency of the electric motor due to harmonic components, and/or a malfunction occurrence frequency due to heat generation of the inverter.

The modulation method determination unit 130 determines the PWM method based on the current THD and the comparison result of the temperature of the electric motor. When the current THD is less than the reference current THD and the temperature of the electric motor is less than the reference temperature of the electric motor, the modulation method determination unit 130 determines the PWM method to be changed from the first modulation method to the second modulation method. When the temperature of the electric motor is relatively high although the current THD of the output current is decreased, the modulation method determination unit 130 does not change the PWM method. Thus, the control apparatus 100 may efficiently drive the electric motor in consideration of the heat generation of the electric motor as well as power and harmonic distortion of the electric motor.

In addition, the modulation method determination unit 130 may use all of the current THD, the temperature of the inverter, and the temperature of the electric motor to determine the PWM method. In this case, the modulation method determination unit 130 compares the current THD, the temperature of the inverter, and the temperature of the electric motor with respective references, and determines the PWM method based on the respective comparison results.

When the current THD is less than the reference current THD, the temperature of the inverter is less than the reference temperature of the inverter, and the temperature of the electric motor is less than the reference temperature of the electric motor, the modulation method determination unit 130 determines the PWM method to be changed from the first modulation method to the second modulation method. Thus, the control apparatus 100 may efficiently drive the electric motor in consideration of the heat generation of the inverter and the heat generation of the electric motor as well as power and harmonic distortion of the electric motor.

The control pulse signal generation unit 140 generates a control pulse signal based on the PWM method determined by the modulation method determination unit 130. The control pulse signal generation unit 140 outputs the generated control pulse signal to the inverter.

Figure 2:
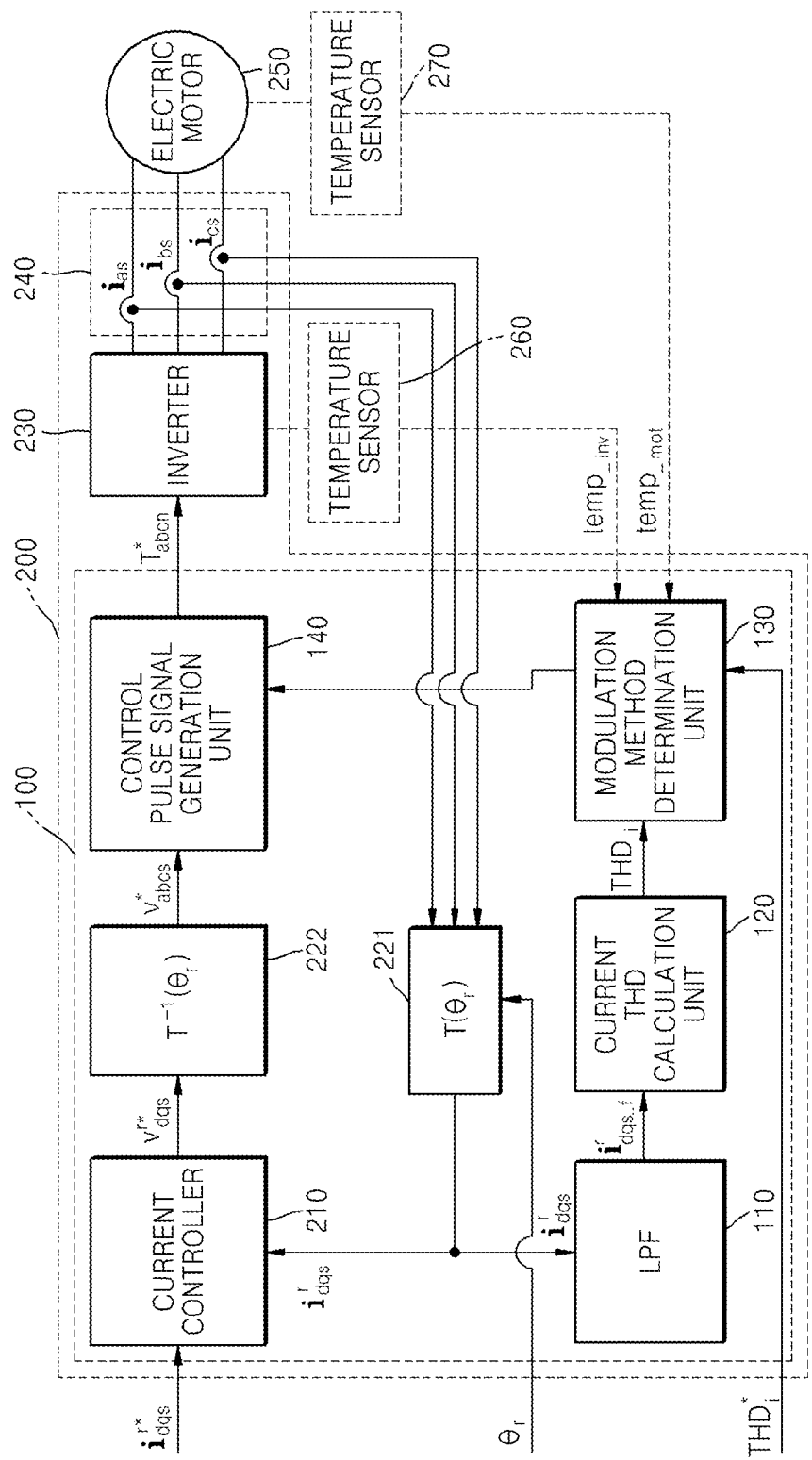
FIG. 2 is a block diagram of an electric motor drive system for controlling the driving of an electric motor by using the apparatus of FIG. 1, according to some example embodiments.

FIG. 2 is a block diagram of an electric motor drive system 200 for controlling the driving of an electric motor 250 by using the control apparatus 100 of FIG. 1, according to some example embodiments. Referring to FIG. 2, the electric motor drive system 200 includes the control apparatus 100, an inverter 230, and a current detector 240. The control apparatus 100 includes a current controller 210, a first coordinate transformation unit 221, a second coordinate transformation unit 222, an LPF 110, a current THD calculation unit 120, a modulation method determination unit 130, and a control pulse signal generation unit 140.

FIG. 2 illustrates only components related to some example embodiments. However, it will be understood by one of ordinary skill in the art that the electric motor drive system 200 may further include other general-purpose components.

The descriptions of the LPF 110, the current THD calculation unit 120, the modulation method determination unit 130, and the control pulse signal generation unit 140 of FIG. 1 may be applied to the LPF 110, the current THD calculation unit 120, the modulation method determination unit 130, and the control pulse signal generation unit 140 of FIG. 2, and thus are not repeated.

The control apparatus 100 illustrated in FIG. 2 controls an output voltage of the inverter 230 that drives the electric motor 250. The control apparatus 100 generates a control pulse signal based on a first command signal $i^{r*}_{dqs}$ input to control the driving of the electric motor 250 and a current $i_{abcs}$ (e.g., $i_{as}$, $i_{bs}$, $i_{cs}$) detected by the current detector 240. The generated control pulse signal is output to the inverter 230, and an output voltage of the inverter 230 is controlled by the control pulse signal.

The first coordinate transformation unit 221 transforms output currents $i_{as}$, $i_{bs}$, and $i_{cs}$ in three phases detected by the current detector 240 into current vectors $i^{r}_{ds}$ and $i^{r}_{qs}$ of a d-q rotating coordinate system. The first coordinate transformation unit 221 may transform the output currents $i_{as}$, $i_{bs}$, and $i_{cs}$ in three phases of a stationary coordinate system into the current vectors $i^{r}_{ds}$ and $i^{r}_{qs}$ of the d-q rotating coordinate system, with reference to the position $\theta_r$ of a rotator of the electric motor 250.

For example, the first coordinate transformation unit 221 may transform the output currents $i_{as}$, $i_{bs}$, and $i_{cs}$ in three phases of the stationary coordinate system into current vectors $i^{s}_{ds}$ and $i^{s}_{qs}$ of a d-q stationary coordinate system, and then may finally convert the current vectors $i^{s}_{ds}$ and $i^{s}_{qs}$ of the d-q stationary coordinate system into the current vectors $i^{r}_{ds}$ and $i^{r}_{qs}$ of a d-q synchronous rotating coordinate system through an arithmetic operation of $e\text{-}j\theta$.

The current vectors $i^{r}_{ds}$ and $i^{r}_{qs}$ (e.g., $i^{r}_{dqs}$) output from the first coordinate transformation unit 221 are input to the current controller 210 and the LPF 110.

The LPF 110 removes a high frequency component of the output current by using coordinate-transformed output currents, that is, the current vectors $i^{r}_{ds}$ and $i^{r}_{qs}$. Thus, harmonic components of the output current are removed, and $i^{r}_{ds\_f}$ and $i^{r}_{qs\_f}$ corresponding to a fundamental component of the output current are obtained.

The current THD calculation unit 120 calculates a current THD THDi by using a fundamental component $i\_f$ of the output current. The current THD THDi may be represented as the ratio of all harmonic components to the fundamental component. The current THD THDi may be calculated according to Equation (1).

$$THD_i = \frac{\sqrt{|i^{r}_{dqs}|^2 - |i\_f|^2}}{|i\_f|} \quad (1)$$

In Equation (1), $THD_i$ denotes a current THD of the output current, $i^{r}_{dqs}$ denotes the output current that is output to the electric motor 250, and $i\_f$ denotes a fundamental component of the output current. In detail, $i^{r}_{dqs}$ is a value coordinate-transformed by the first coordinate transformation unit 221 after being detected by current detector 240. $i\_f$ is a value obtained by removing a high frequency component with respect to the output current by using an LPF, and corresponds to the fundamental component of the output current.

In Equation (1), the numerator is an effective value corresponding to a value obtained by removing the fundamental component from the output current, and corresponds to all harmonic components in the output current. The denominator represents the fundamental component of the output current. Thus, as described above, the current THD $THD_i$ is expressed as the ratio of all harmonic components to the fundamental component of the output current.

In this case, $|i\_f|$ corresponding to the size of the fundamental component of the output current may be calculated according to Equation (2).

$$|i\_f| = \sqrt{i_{ds\_f}^2 + i_{qs\_f}^2} \quad (2)$$

In Equation (2), $i\_f$ denotes the fundamental component of the output current, and $i^r_{ds\_f}$ and $i^r_{qs\_f}$ are values coordinate-transformed by the first coordinate transformation unit 221 after being detected by the current detector 240.

While the current THD calculation unit 120 may calculate the current THD according to Equations (1) and (2), example embodiments are not limited thereto. In this manner, the current THD calculation unit 120 may easily obtain the current THD by using an LPF and not an arithmetic operation such as a Fourier Transform, and thus may reduce the amount of calculations.

The modulation method determination unit 130 compares the magnitude of the current THD $THD_i$ with the magnitude of a reference current THD $THD_i^*$ and determines the PWM method for modulating a pulse width of a control pulse signal based on the comparison result. More specifically, when the magnitude of the current THD $THD_i$ is less than that of the reference current THD $THD_i^*$, the modulation method determination unit 130 determines the PWM method to be changed from the first modulation method to the second modulation method to reduce a switching frequency of the inverter. Conversely, when the magnitude of the current THD $THD_i$ is greater than that of the reference current THD $THD_i^*$, the modulation method determination unit 130 determines the PWM method to be changed from the second modulation method to the first modulation method to reduce harmonic components in the output current again.

The current controller 210 generates a second command signal $v^{r*}_{dqs}$ based on the coordinate-transformed output currents $i^r_{ds}$ and $i^r_{qs}$ and the first command signal $i^{r*}_{dqs}$ input to control the driving of the electric motor 250. The second command signal $v^{r*}_{dqs}$ corresponds to a voltage vector of the d-q rotating coordinate system.

The current controller 210 allows a desired current to flow in the electric motor 250. The current controller 210 compensates for errors between the first command signal $i^{r*}_{dqs}$ and output currents detected in the electric motor 250, that is, the coordinate-transformed output currents $i^r_{ds}$ and $i^r_{qs}$ and generates the second command signal $v^{r*}_{dqs}$ in which errors are compensated.

The second coordinate transformation unit 222 transforms the second command $v^{r*}_{dqs}$ into command voltages $v_{as}^*$, $v_{bs}^*$, and $v_{cs}^*$ (e.g., $v_{abcs}^*$) in three phases of the stationary coordinate system. The second coordinate transformation unit 222 may transform command voltage vectors $v^{r*}_{ds}$ and $v^{r*}_{qs}$ of the d-q rotating coordinate system into the command voltages $v_{as}^*$, $v_{bs}^*$, and $v_{cs}^*$ in three phases of the stationary coordinate system, with reference to the position $\theta_r$ of the rotator of the electric motor 250.

The control pulse signal generation unit 140 generates a control pulse signal based on a PWM method determined by the modulation method determination unit 130 to output an output voltage of the inverter 230 according to the coordinate-transformed command voltages $V_{as}^*$, $v_{bs}^*$, and $v_{cs}^*$. The control pulse signal generation unit 140 outputs the generated control pulse signal to the inverter 230.

The inverter 230 receives a control pulse signal $T^*_{abcn}$ (e.g., $T^*_{an}$, $T^*_{bn}$, $T^*_{cn}$) from the control apparatus 100. The inverter 230 converts an input power according to the control pulse signal output from the control apparatus 100, and generates an output voltage that is applied to the electric motor 250. The output voltage of the inverter 230 is controlled based on the first command signal $i^{r*}_{dqs}$ input to control the driving of the electric motor 250 and a current detected by the current detector 240. The inverter 230 may be a voltage source inverter (VSI) or a current source inverter (CSI).

In some example embodiments, the inverter 230 is a PWM inverter that is driven according to a PWM method. Switching devices of the inverter 230 are switched on/off according to the control pulse signal. By modulating the on/off pulse width of the control pulse signal in the control apparatus 100, the magnitude and frequency of an output voltage of the inverter 230 are controlled. The inverter 230 supplies an output voltage generated according to the control pulse signal to the electric motor 250.

The current detector 240 detects a current in the operating electric motor 250. The control apparatus 100 according to some example embodiments obtains a current THD based on a current detected in real time by the current detector 240 and determines a PWM method based on the obtained current THD, and thus, the control apparatus 100 may adaptively change the PWM method according to the switching frequency of the inverter 230 and the variation of the output voltage. The current detector 240 may be implemented using a shunt resistor or an instrumental current transformer.

The electric motor 250 is driven by an output voltage received from the inverter 230 to generate a torque required to drive a load. The driving of the electric motor 250 is controlled based on a current detected in the electric motor 250 and the first command signal $i^{r*}_{dqs}$ input to control the driving of the electric motor 250.

According to some example embodiments, the current apparatus 100 may maximize the power efficiency of the electric motor 250 while minimizing distortion due to a harmonic components over the whole output range of the electric motor 250 by determining a PWM method based on the current THD.

According to some example embodiments, the modulation method determination unit 130 may further use, other than the current THD, the temperature of the inverter 230 to determine the PWM method. For example, the temperature of the inverter 230 may be detected by a temperature sensor 260. Thus, the modulation method determination unit 130 may determine the PWM method based on the current THD and a comparison result of the temperature of the inverter 230.

According to some example embodiments, the modulation method determination unit 130 may further use, other than the current THD, the temperature of the electric motor 250 to determine the PWM method. For example, the temperature of the electric motor 250 may be detected by a temperature sensor 270. Thus, the modulation method determination unit 130 determines the PWM method based on the current THD and a comparison result of the temperature of the electric motor 250.

According to some example embodiments, the modulation method determination unit 130 may use all of the current THD, the temperature of the inverter 230, and the temperature of the electric motor 250 to determine the PWM method. Thus, the control apparatus 100 may efficiently drive the electric motor 250 in consideration of the heat generation of the inverter 230 and the heat generation of the electric motor 250 as well as power and harmonic distortion of the electric motor 250.

Figure 3:
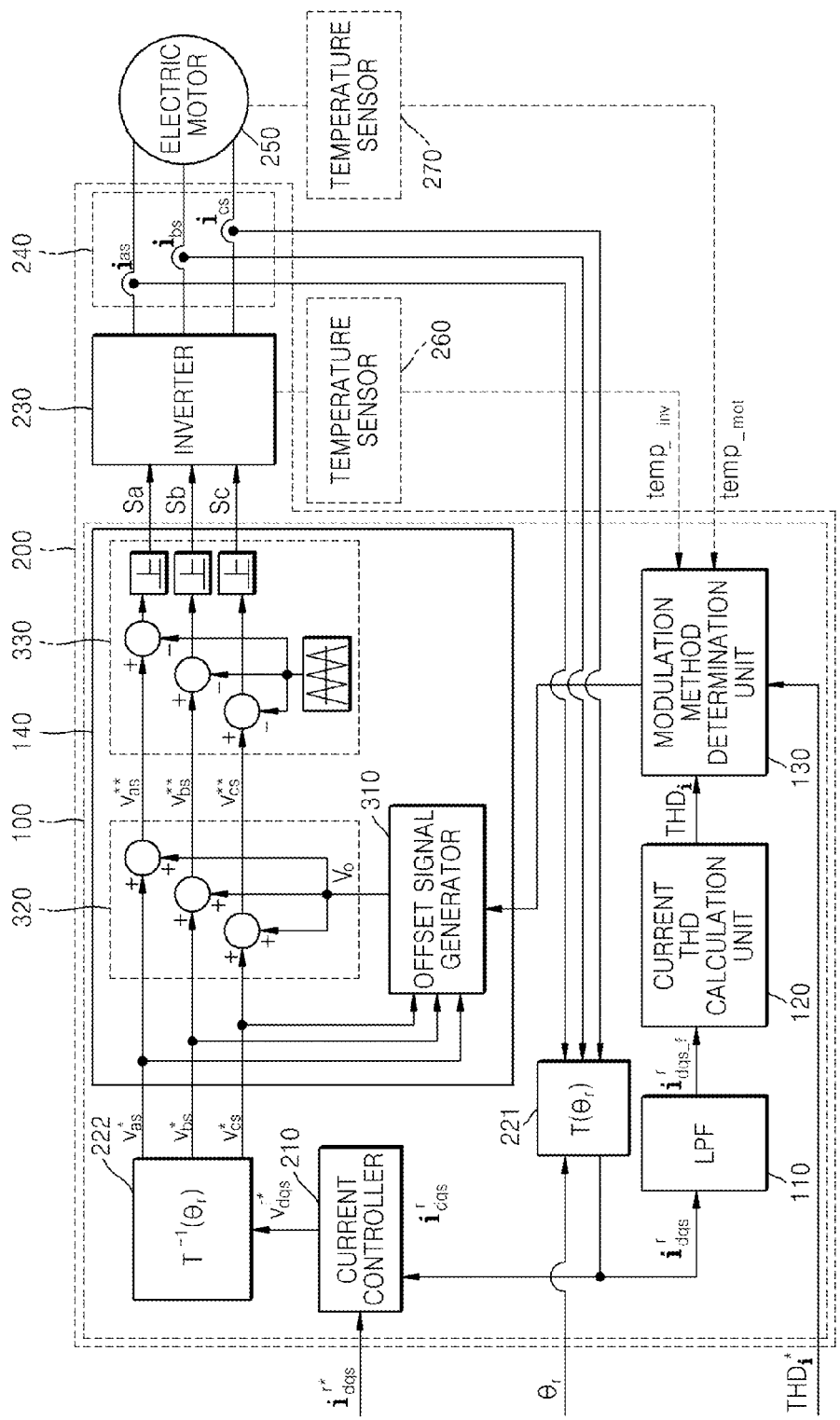
FIG. 3 is a block diagram of an electric motor drive system for controlling the driving of an electric motor by using the apparatus of FIG. 1, according to some example embodiments.

FIG. 3 is a block diagram of an electric motor drive system 200 for controlling the driving of an electric motor 250 by using the control apparatus 100 of FIG. 1, according to some example embodiments.

Referring to FIG. 3, the electric motor drive system 200 includes the control apparatus 100, an inverter 230, and a current detector 240. The control apparatus 100 includes a current controller 210, a first coordinate transformation unit 221, a second coordinate transformation unit 222, an LPF 110, a current THD calculation unit 120, a modulation method determination unit 130, and a control pulse signal generation unit 140. The control pulse signal generation unit 140 may include an offset signal generator 310, a third command signal generator 320, and a comparator 330.

FIG. 3 illustrates only components related to some example embodiments. However, it will be understood by one of ordinary skill in the art that the electric motor drive system 200 may further include other general-purpose components. The descriptions of the LPF 110, the current THD calculation unit 120, the modulation method determination unit 130, and the control pulse signal generation unit 140 of FIGS. 1 and 2 may be applied to the LPF 110, the current THD calculation unit 120, the modulation method determination unit 130, and the control pulse signal generation unit 140 of FIG. 3, and thus are not repeated.

The LPF 110 removes a high frequency component of an output current that is output to an electric motor 250. Thus, harmonic components of the output current are removed by the LPF 110, and a fundamental component of the output current may be obtained.

The current THD calculation unit 120 calculates a current THD by using the fundamental component of the output current.

The modulation method determination unit 130 determines any one of the first and second modulation methods as a PWM method according to the current THD.

The offset signal generator 310 generates an offset signal Vo corresponding to the determined PWM method. The offset signal Vo is also referred to as a zero-sequence signal. More specifically, in order to modulate the pulse width of a control pulse signal by using the determined PWM method, the control apparatus 100 according to some example embodiments generates an offset signal corresponding to the determined PWM method and adds the offset signal to a command voltage input to control the driving of the electric motor 250.

According to some example embodiments, the inverter 230 outputs output voltages in three phases. Thus, although an offset signal is added to each of the output voltages in three phases, a voltage applied to a load of the electric motor 250 is a difference between two output voltages, thereby removing the offset signal component.

The third command signal generator 320 receives the coordinate-transformed command voltages $v_{as}^*$, $v_{bs}^*$, and $v_{cs}^*$ and the offset signal Vo, and adds the offset signal Vo to the coordinate-transformed command voltages $v_{as}^*$, $v_{bs}^*$, and $v_{cs}^*$ to generate third command signals $v_{as}^{}$, $v_{bs}^{}$, and $v_{cs}^{}$. The third command signal generator 320 outputs the third command signals $v_{as}^{}$, $v_{bs}^{}$, and $v_{cs}^{}$ to the comparator 330.

The comparator 330 compares the magnitudes of the third command signals $v_{as}^{}$, $v_{bs}^{}$, and $v_{cs}^{**}$ with that of a triangular carrier wave and generates a control pulse signal $S_{abc}$ (e.g., $S_a$, $S_b$, $S_c$) based on a comparison result.

More specifically, the comparator 330 compares the magnitudes of the third command signals $v_{as}^{}$, $v_{bs}^{}$, and $v_{cs}^{}$ with that of the triangular carrier wave to determine the on/off state of the control pulse signal. For example, if the magnitudes of the third command signals $v_{as}^{}$, $v_{bs}^{}$, and $v_{cs}^{}$ are larger than that of the triangular carrier wave, the comparator 330 determines that the control pulse signal is in an on state. On the other hand, if the magnitudes of the third command signals $v_{as}^{}$, $v_{bs}^{}$, and $v_{cs}^{**}$ are smaller than that of the triangular carrier wave, the comparator 330 determines that the control pulse signal is in an off state.

That is, the comparator 330 generates a control pulse signal based on the on/off state of the control pulse signal, which is determined according to the comparison result, and outputs the control signal to the inverter 230. As described above, the control signal is generated based on the PWM method determined according to the current THD.

Thus, when the current THD is high, the control apparatus 100 is configured to reduce the number of harmonic components of the output current that is output to the electric motor 250, thereby decreasing the losses due to harmonics. When the current THD is low, the control apparatus 100 changes the PWM method to increase the efficiency of the output voltage of the inverter 230 instead of reducing the number of harmonic components of the output current that is output to the electric motor 250.

In addition, the control apparatus 100 may adaptively determine the PWM method for modulating a control pulse signal according to changes in the output voltage and a switching frequency of the inverter 230 in accordance with the current THD. Thus, the control apparatus 100 may be used regardless of the output range of the electric motor 250 and the switching frequency range of the inverter 230.

Figure 4:
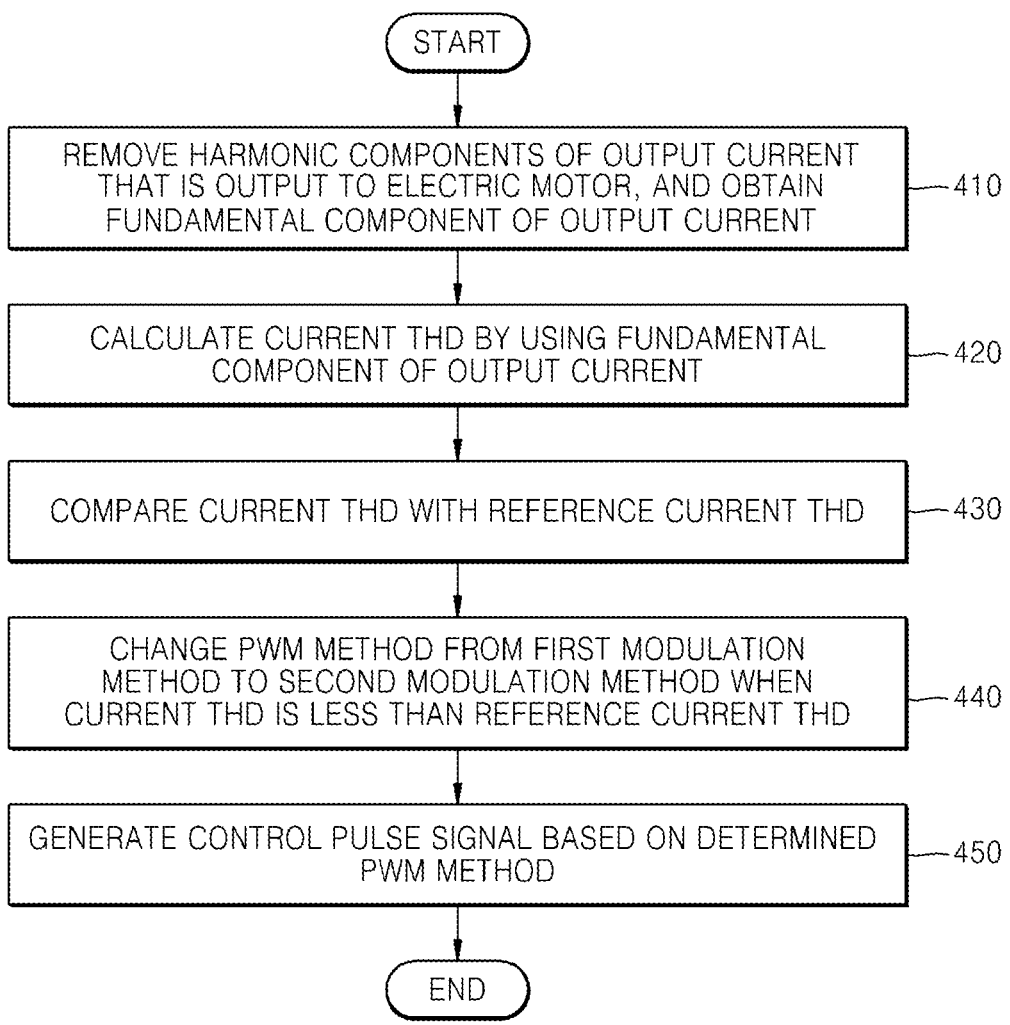
FIG. 4 is a flowchart illustrating a method of controlling an output voltage of an inverter driving an electric motor, according to some example embodiments.

FIG. 4 is a flowchart illustrating a method of controlling an output voltage of the inverter 230 driving the electric motor 250, according to some example embodiments. Referring to FIG. 4, the method includes time-series operations 410 through 450. Although not described below, the above descriptions of the control apparatus 100 with reference to FIGS. 1 to 3 may also apply to the description of the method illustrated in FIG. 4.

In operation 410, the LPF 110 removes harmonic components of an output current that is output to the electric motor 250, and thus obtains a fundamental component of the output current.

In operation 420, the current THD calculation unit 120 calculates a current THD by using the fundamental component of the output current. A current THD is the extent of distortion of a waveform due to harmonic components, and the current THD may be represented as the ratio of all harmonic components to the fundamental component.

In operation 430, the modulation method determination unit 130 receives the current THD calculated in operation 420 and compares the current THD with a reference current THD.

In operation 440, when the current THD is less than the reference current THD, the modulation method determination unit 130 changes a PWM method from a first modulation method, which reduces harmonic components in the output current, to a second modulation method that reduces a switching frequency of the inverter 230.

In operation 450, the control pulse signal generation unit 140 generates a control pulse signal based on the PWM method, and the control pulse signal is output to the inverter 230.

According to some example embodiments, by changing the PWM method based on the current THD, the control apparatus 100 may adaptively determine the PWM method for modulating the control pulse signal according to changes in the output voltage and a switching frequency of the inverter 230.

Figure 5:
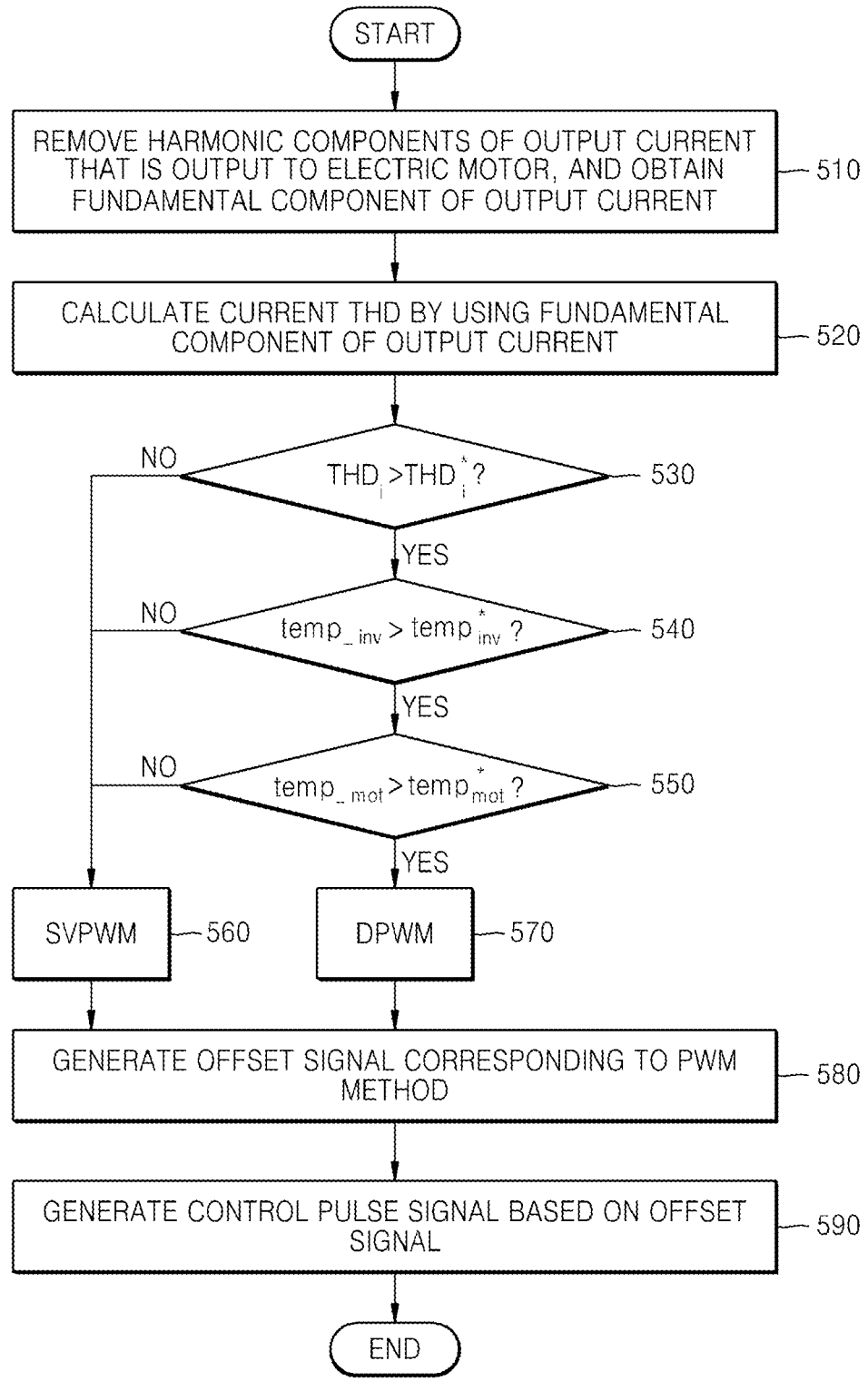
FIG. 5 is a flowchart illustrating a method of controlling an output voltage of an inverter driving an electric motor, according to some example embodiments.

FIG. 5 is a flowchart of a method for controlling an output voltage of the inverter 230 driving the electric motor 250, according to some example embodiments. Referring to FIG. 5, the method illustrated in FIG. 5 includes time-series operations 510 through 590. Although not described below, the above descriptions of the control apparatus 100 with reference to FIGS. 1 to 3 may apply to the description of the method illustrated in FIG. 5.

In operation 510, the LPF 110 removes harmonic components of an output current that is output to the electric motor 250, and thus obtains a fundamental component of the output current.

In operation 520, the current THD calculation unit 120 calculates a current THD by using the fundamental component of the output current.

In operation 530, the modulation method determination unit 130 compares the current THD $THD_i$ obtained in operation 520 with a reference current THD $THD_i^*$ input to the control apparatus 100. If the current THD $THD_i$ is greater than the reference current THD $THD_i^*$, the method proceeds to operation 540. Otherwise, if the current THD $THD_i$ is less than the reference current THD $THD_i^*$, the method proceeds to operation 560.

In operation 540, the modulation method determination unit 130 compares a temperature $temp\_{inv}$ of the inverter 230 measured by the temperature sensor 260 with a reference temperature $temp\_{inv}^*$ of the inverter 230 input to the control apparatus 100. If the temperature $temp\_{inv}$ of the inverter 230 is higher than the reference temperature $temp\_{inv}^*$ of the inverter 230, the method proceeds to operation 550. Otherwise, if the temperature $temp\_{inv}$ of the inverter 230 is lower than the reference temperature $temp\_{inv}^*$ of the inverter 230, the method proceeds to operation 560.

In operation 550, the modulation method determination unit 130 compares a temperature $temp\_{mot}$ of the electric motor 250 measured by the temperature sensor 270 with a reference temperature $temp\_{mot}^*$ of the electric motor 250 input to the control apparatus 100. If the temperature $temp\_{mot}$ of the electric motor 250 is higher than the reference temperature $temp\_{mot}^*$ of the electric motor 250, the method proceeds to operation 570. Otherwise, if the temperature $temp\_{mot}$ of the electric motor 250 is lower than the reference temperature $temp\_{mot}^*$ of the electric motor 250, the method proceeds to operation 560.

In operation 560, the modulation method determination unit 130 changes the PWM method for modulating a pulse width of a control pulse signal for controlling an output voltage of the inverter 230 to an SVPWM technique. The SVPWM technique may reduce harmonic components in the output current or the output voltage applied to the electric motor 250.

In operation 570, the modulation method determination unit 130 changes the PWM method to a DPWM technique that may reduce switching losses of the inverter 230 and thus may improve the efficiency of the electric motor 250.

In operation 580, the control pulse signal generation unit 140 generates an offset signal corresponding to the PWM method changed in operation 560 or 570.

In operation 590, the control pulse signal generation unit 140 generates a control pulse signal based on the offset signal generated in operation 580. The control pulse signal is output to the inverter 230.

When the current THD is relatively high, the control apparatus 100 according to some example embodiments determines a PWM method as an SVPWM technique in order to reduce harmonic components of the output current or the output voltage. Conversely, when the current THD is relatively low, the control apparatus 100 changes the PWM method to a DPWM scheme in order to improve the efficiency of the output voltage of the inverter 230 instead of reducing the number of harmonic components.

Accordingly, the control apparatus 100 may efficiently drive the electric motor (not shown) in consideration of the heat generation of the inverter (not shown) as well as power and harmonic distortion of the electric motor.

Figure 6:
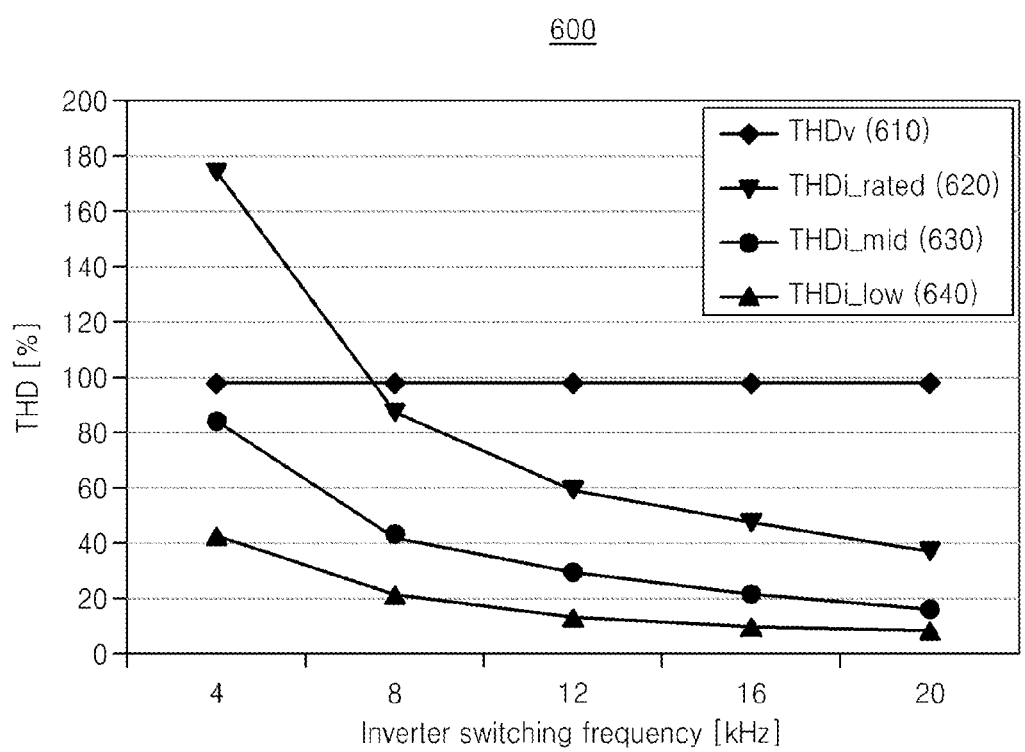
FIG. 6 is a graph of a current or voltage total harmonic distortion (THD) versus an inverter switching frequency.

FIG. 6 is a graph 600 of a current or voltage THD vs. an inverter switching frequency. The abscissa and ordinate in the graph 600 denote a switching frequency of the inverter 230 and a current THD, respectively. THDv 610 denotes a voltage THD with respect to the switching frequency of the inverter 230, which means the amount of harmonic components in an output voltage applied to the electric motor 250. The voltage THD THDv 610 remains constant regardless of a range of the output voltage.

However, the current THD varies according to a range of the output voltage. THDi_rated 620, THDi_mid 630, and THDi_low 640 denote currents THDs with respect to the switching frequency of the inverter 230 for respective output voltages applied to the electric motor 250. More specifically, THDi_rated 620 represents a current THD with respect to a switching frequency when a rated voltage is applied to the electric motor 250. THDi_low 640 represents a current THD with respect to a switching frequency when a voltage lower than the rated voltage is applied. THDi_mid 630 represents a current THD with respect to a switching frequency when a voltage between the rated voltage and the voltage lower than the rated voltage is applied.

Referring to FIG. 6, the voltage THD THDv 610 maintains a constant value over the whole range of switching frequencies of the inverter 230 while the currents THDs THDi_rated 620, THDi_mid 630, and THDi_low 640 vary according to a switching frequency of the inverter 230. As apparent from the graph 600, a current THD increases as the range of the output voltage increases and the switching frequency of the inverter 230 decreases.

By determining the PWM method according to a current THD instead of a voltage THD based on a voltage modulation index (MI), the control apparatus 100 according to some example embodiments may adaptively change the PWM method according to changes in the switching frequency of the inverter 230 and the output voltage.

Some example embodiments can also be implemented through computer-readable code/instructions in/on a medium, e.g., a computer-readable medium, to control at least one processing element to implement any above-described example embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., read-only memory (ROM), floppy disks, hard disks, etc.) and optical recording media (e.g., compact disc read-only memories (CD-ROMs) or digital video discs (DVDs)), and transmission media such as Internet transmission media. Thus, the medium may be such a defined and measurable structure including or carrying a signal or information, such as a device carrying a bitstream according to some example embodiments. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A method of controlling an output voltage of an inverter driving an electric motor, the method comprising:
    removing harmonic components of an output current, which is output to the electric motor, by using a low pass filter (LPF) and obtaining a fundamental component of the output current;
    calculating a current total harmonic distortion (THD) by using the fundamental component of the output current;
    comparing the current THD with a reference current THD;
    determining a pulse width modulation (PWM) method to be changed from a first modulation method for reducing the harmonic components of the output current to a second modulation method for reducing a switching frequency of the inverter if the current THD is less than the reference current THD, the PWM method modulating a pulse width of a control pulse signal for controlling the output voltage of the inverter; and
    generating the control pulse signal based on the determined PWM method.

2. The method of claim 1, further comprising:
    detecting a temperature of the inverter; and
    comparing the detected temperature of the inverter with a reference temperature of the inverter;
    wherein the determining of the PWM method comprises determining the PWM method to be changed from the first modulation method to the second modulation method if the current THD is less than the reference current THD and the detected temperature of the inverter is lower than the reference temperature of the inverter.

3. The method of claim 1, further comprising:
    detecting a temperature of the electric motor; and
    comparing the detected temperature of the electric motor with a reference temperature of the electric motor;
    wherein the determining of the PWM method comprises determining the PWM method to be changed from the first modulation method to the second modulation method if the current THD is less than the reference current THD and the detected temperature of the electric motor is lower than the reference temperature of the electric motor.

4. The method of claim 1, further comprising:
    detecting a temperature of the inverter;
    detecting a temperature of the electric motor;
    comparing the detected temperature of the inverter with a reference temperature of the inverter; and
    comparing the detected temperature of the electric motor with a reference temperature of the electric motor;
    wherein the determining of the PWM method comprises determining the PWM method to be changed from the first modulation method to the second modulation method if the current THD is less than the reference current THD, the detected temperature of the inverter is lower than the reference temperature of the inverter, and the detected temperature of the electric motor is lower than the reference temperature of the electric motor.

5. The method of claim 1, wherein the determining of the PWM method comprises determining the PWM method to be changed from the second modulation method to the first modulation method if the current THD is greater than the reference current THD.

6. The method of claim 1, wherein the first modulation method is a space vector pulse width modulation (SVPWM) technique, and the second modulation method is a discontinuous pulse width modulation (DPWM) technique.

7. The method of claim 1, wherein the generating of the control pulse signal comprises generating the control pulse signal based on an offset signal corresponding to the determined PWM method.

8. The method of claim 1, wherein the generating of the control pulse signal comprises:
    generating an offset signal corresponding to the determined PWM method;
    generating a second command signal by adding the offset signal to a first command signal input to control the driving of the electric motor;
    comparing a magnitude of the second command signal with a magnitude of a triangular carrier wave; and
    generating the control pulse signal based on a result of the comparison.

9. The method of claim 1, wherein the determining of the PWM method comprises adaptively determining the PWM method as the current THD changes according to the output voltage and a switching frequency of the inverter.

10. A computer-readable recording medium having recorded thereon a program for executing the method of claim 1.

11. An apparatus for controlling an output voltage of an inverter driving an electric motor, the apparatus comprising:
    a low pass filter (LPF) configured to remove harmonic components of an output current, which is output to the electric motor, to obtain a fundamental component of the output current;
    a current total harmonic distortion (THD) calculation unit configured to calculate a current THD by using the fundamental component of the output current;
    a modulation method determination unit configured to compare the current THD with a reference current THD and configured to determine a pulse width modulation (PWM) method to be changed from a first modulation method for reducing the harmonic components of the output current to a second modulation method for reducing a switching frequency of the inverter if the current THD is less than the reference current THD, the PWM method modulating a pulse width of a control pulse signal for controlling the output voltage of the inverter; and
    a control pulse signal generation unit configured to generate the control pulse signal based on the determined PWM method.

12. The apparatus of claim 11, wherein the modulation method determination unit is further configured to compare a temperature of the inverter with a reference temperature of the inverter and is further configured to determine the PWM method to be changed from the first modulation method to the second modulation method when the current THD is less than the reference current THD and the temperature of the inverter is lower than the reference temperature of the inverter.

13. The apparatus of claim 11, wherein the modulation method determination unit is further configured to compare a temperature of the electric motor with a reference temperature of the electric motor and is further configured to determine the PWM method to be changed from the first modulation method to the second modulation method when the current THD is less than the reference current THD and the temperature of the electric motor is lower than the reference temperature of the electric motor.

14. The apparatus of claim 11, wherein the modulation method determination unit is further configured to compare a temperature of the inverter and a temperature of the electric motor with a reference temperature of the inverter and a reference temperature of the electric motor, respectively, and is further configured to determine the PWM method to be changed from the first modulation method to the second modulation method when the current THD is less than the reference current THD, the temperature of the inverter is lower than the reference temperature of the inverter, and the temperature of the electric motor is lower than the reference temperature of the electric motor.

15. The apparatus of claim 11, wherein the modulation method determination unit is configured to determine the PWM method to be changed from the second modulation method to the first modulation method when the current THD is greater than the reference current THD.

16. The apparatus of claim 11, wherein the first modulation method is a space vector pulse width modulation (SVPWM) technique, and the second modulation method is a discontinuous pulse width modulation (DPWM) technique.

17. The apparatus of claim 11, wherein the modulation method determination unit is further configured to adaptively determine the PWM method as the current THD changes according to the output voltage and a switching frequency of the inverter.

18. A system for driving an electric motor, the system comprising:
a current detector configured to detect an output current which is output to the electric motor;
a control apparatus configured to determine a pulse width modulation (PWM) method for modulating a pulse width of a control pulse signal based on a current total harmonic distortion (THD) of the output current and configured to generate the control pulse signal based on the determined PWM method; and
an inverter configured to convert an input power supply into an output voltage based on the control pulse signal and configured to supply the output voltage to the electric motor;
wherein the control apparatus comprises:
a low pass filter (LPF) configured to remove harmonic components of the output current to obtain a fundamental component of the output current;
a current THD calculation unit configured to calculate the current THD by using the fundamental component of the output current;
a modulation method determination unit configured to compare the current THD with a reference current THD and determines the PWM method to be changed from a space vector pulse width modulation (SVPWM) technique to a discontinuous pulse width modulation (DPWM) technique; and
a control pulse signal generation unit configured to generate the control pulse signal based on the determined PWM method.

19. The system of claim 18, further comprising:
a first temperature sensor configured to detect a temperature of the inverter; and
a second temperature sensor configured to detect a temperature of the electric motor;
wherein the modulation method determination unit is further configured to compare the temperature of the inverter and the temperature of the electric motor with a reference temperature of the inverter and a reference temperature of the electric motor, respectively, and is further configured to determine the PWM method to be changed from the SVPWM technique to the DPWM technique when the current THD is less than the reference current THD, the detected temperature of the inverter is lower than the reference temperature of the inverter, and the detected temperature of the electric motor is lower than the reference temperature of the electric motor.

20. The system of claim 18, wherein the modulation method determination unit is further configured to adaptively determine the PWM method as the current THD changes according to the output voltage and a switching frequency of the inverter.

* * * * *